(12) United States Patent
Chou

(10) Patent No.: US 8,174,577 B2
(45) Date of Patent: May 8, 2012

(54) AUTOMATIC IN-CAR VIDEO RECORDING APPARATUS FOR RECORDING DRIVING CONDITIONS INSIDE AND OUTSIDE A CAR

(75) Inventor: Rong-Her Chou, Yu-Lin Hsien (TW)

(73) Assignee: Tech-Cast Mfg. Corp., Yu-Lin Hsien (TW)

( * ) Notice: Subject to any disclaimer, the term of this patent is extended or adjusted under 35 U.S.C. 154(b) by 898 days.

(21) Appl. No.: 12/208,428

(22) Filed: Sep. 11, 2008

(65) Prior Publication Data

US 2010/0060734 A1    Mar. 11, 2010

(51) Int. Cl.
*H04N 7/18* (2006.01)

(52) U.S. Cl. ..... 348/148; 348/143; 348/152; 340/425.5; 340/435

(58) Field of Classification Search ........... 348/143–149
See application file for complete search history.

(56) References Cited

U.S. PATENT DOCUMENTS

| | | | |
|---|---|---|---|
| 6,795,111 B1* | 9/2004 | Mazzilli | 348/148 |
| 7,119,832 B2* | 10/2006 | Blanco et al. | 348/148 |
| 2003/0151663 A1* | 8/2003 | Lorenzetti et al. | 348/148 |
| 2003/0210328 A1* | 11/2003 | Mazzilli | 348/148 |
| 2004/0109059 A1* | 6/2004 | Kawakita | 348/143 |
| 2004/0145457 A1* | 7/2004 | Schofield et al. | 340/425.5 |
| 2004/0227840 A1* | 11/2004 | Houlberg | 348/345 |
| 2005/0086698 A1* | 4/2005 | Cheng-Yu | 725/105 |
| 2005/0088523 A1* | 4/2005 | Wu et al. | 348/152 |
| 2006/0077256 A1* | 4/2006 | Silvemail et al. | 348/143 |
| 2006/0132604 A1* | 6/2006 | Lao et al. | 348/148 |
| 2006/0164220 A1* | 7/2006 | Harter et al. | 340/435 |
| 2006/0265126 A1* | 11/2006 | Olcott | 701/211 |
| 2007/0207840 A1* | 9/2007 | Kurauchi et al. | 455/569.2 |
| 2008/0204555 A1* | 8/2008 | Hughes | 348/148 |

* cited by examiner

*Primary Examiner* — Wing Chan
*Assistant Examiner* — Razu Miah
(74) *Attorney, Agent, or Firm* — WPAT., P.C.; Justin King

(57) ABSTRACT

An automatic in-car video recording apparatus includes a first and a second image acquiring units, an image processing unit, a control unit, an image access unit, a detecting unit, and a power supply unit. The first and second image acquiring units are synchronized to acquire images of road conditions in front of the car and images of driving conditions inside the car, respectively. The image processing unit integrates the two images on a split screen, and saves the images in the image access unit. The image access unit includes an externally connected memory unit. The control unit periodically stores part of the image data saved in the image access unit on the memory unit. When the detecting unit detects any abnormal condition, the control unit will also copy the image data saved in the image access unit to the memory unit. Therefore, driving conditions of the car are automatically recorded.

9 Claims, 4 Drawing Sheets

AUTOMATIC IN-CAR VIDEO RECORDING APPARATUS FOR RECORDING DRIVING CONDITIONS INSIDE AND OUTSIDE A CAR

FIELD OF THE INVENTION

The present invention relates to an automatic in-car video recording apparatus, more particularly to an automatic in-car video recording apparatus that is synchronously turned on when a car engine is started, so that images of driving conditions inside and outside the car is automatically recorded, and image data immediately before an accident can be automatically saved.

BACKGROUND OF THE INVENTION

Following the progress and development of the modern society, the traffic in cities has become more and more complicated. However, there are many people, including drivers and walkers, do not follow the traffic rules in the environment crowded with cars. As a result, there are accidents of different seriousness occurring everyday. According to an investigation, most of the parties in traffic accidents can hardly remember how the accident occurred. Under this circumstance, it is often very difficult to clarify and determine who should be responsible for the accident and indemnify for loss and damage. In a lucky case, the accident is recorded by a nearby surveillance camera, and it will be easier to clarify who should be responsible for the accident. Lacking such video recorded images as evidence, it would be much harder to correctly find out the truth just by measuring the accident site and inferring the possible reasons. Particularly when there is someone being killed in the accident, it would be unfair and unreasonable to determine the responsibility simply by relying on the survivor's argument. And, even if the survivor's argument is true, it is not necessarily accepted by the families of the dead or the public. That is why many traffic accidents eventually involve in longstanding and weary lawsuit and negotiation for indemnity, and form a spiritual and physical burden for both parties.

It is therefore very important for every driver to help himself or herself in an accident by providing powerful and advantageous evidencing support.

SUMMARY OF THE INVENTION

A primary object of the present invention is to provide an automatic in-car video recording apparatus, which is synchronously turned on when a car engine is started, so that images of driving conditions inside and outside the car are automatically recorded to help in determining who should be responsible for an accident, if any accident occurs.

Another object of the present invention is to provide an automatic in-car video recording apparatus for installing in a car to record driving conditions inside and outside the car, so that a driver is urged to drive safely to thereby minimize the occurrence of accidents.

A further object of the present invention is to provide an automatic in-car video recording apparatus, which can be installed in a public transportation vehicle to dynamically record conditions inside the vehicle, including images of passengers. In case of any troubles, such as thievery, sexual harassment, free ride, robbery, etc., the recorded images can be used as evidence or reference in investigation by police later. Accordingly, the automatic in-car video recording apparatus also provides the effect of crime-fighting and crime prevention.

To achieve the above and other objects, the automatic in-car video recording apparatus of the present invention can be installed in a car to record driving conditions inside and outside the car and save the recorded images. The automatic in-car video recording apparatus according to the present invention includes a first image acquiring unit, a second image acquiring unit, an image processing unit, a control unit, an image access unit, a detecting unit, and a power supply unit. The control unit is electrically connected to the image processing unit, image access unit, detecting unit, and power supply unit. The power supply unit supplies power needed by all other units to operate normally. The image access unit includes an externally connected memory unit. The first image acquiring unit and the second image acquiring unit are electrically connected to the image processing unit. The images acquired by the first and the second image acquiring unit are processed by the image processing unit and then directly saved in the image access unit. The control unit periodically retrieves part of the image data saved in the image access unit and stores the same on the memory unit. When the detecting unit detects any abnormal condition, the control unit can also be driven to copy the image data saved in the image access unit to the memory unit. Accordingly, all driving conditions of the car are automatically recorded and saved.

In the automatic in-car video recording apparatus of the present invention, the first and the second image acquiring unit are synchronized to shoot the road conditions in front of the car and the driver's and passenger's conditions inside the car, respectively. With the image processing unit, the images synchronously shot by the first and the second image acquiring unit can be simultaneously presented on a split screen.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
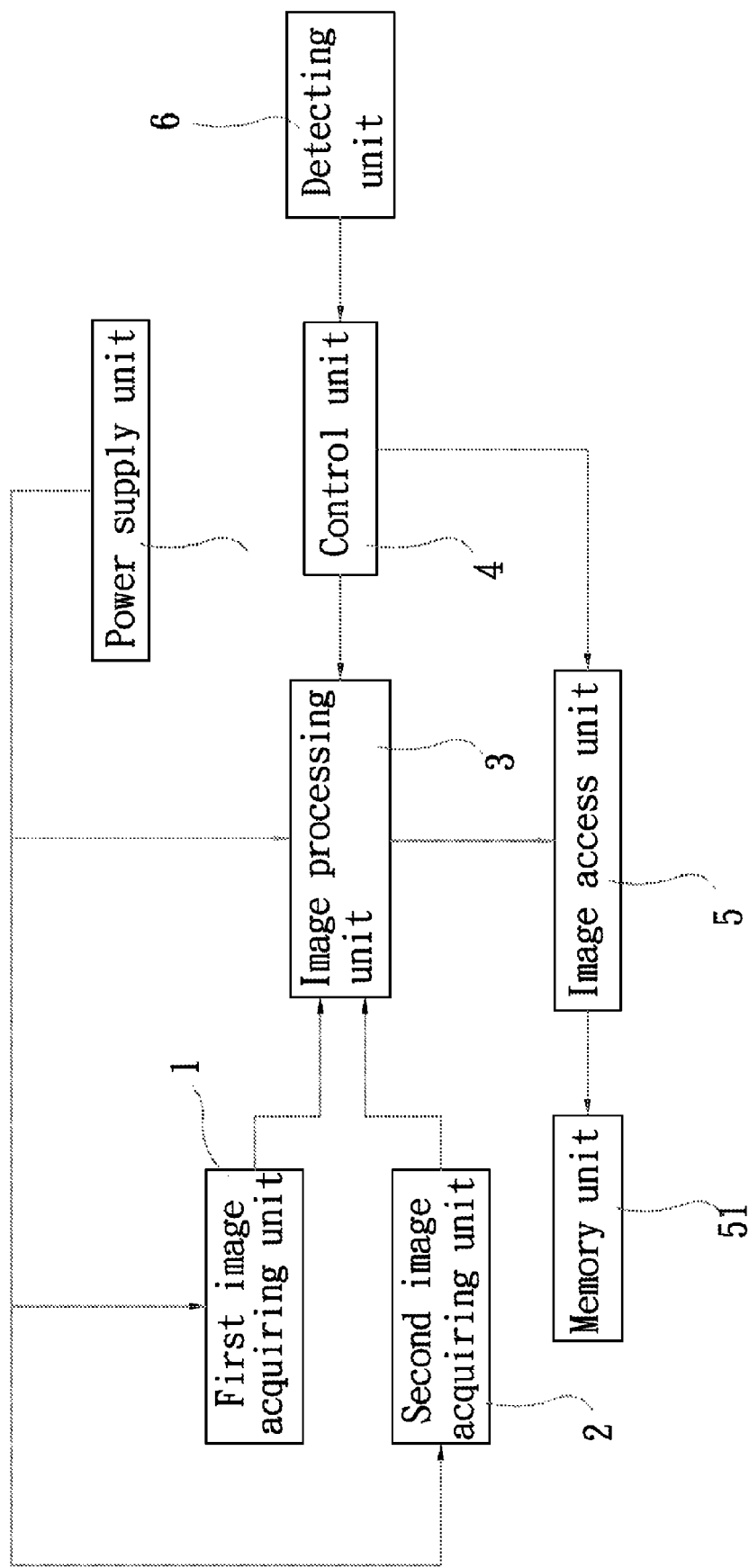
FIG. 1 is a block diagram of an automatic in-car video recording apparatus according to a first embodiment of the present invention.
Figure 2:
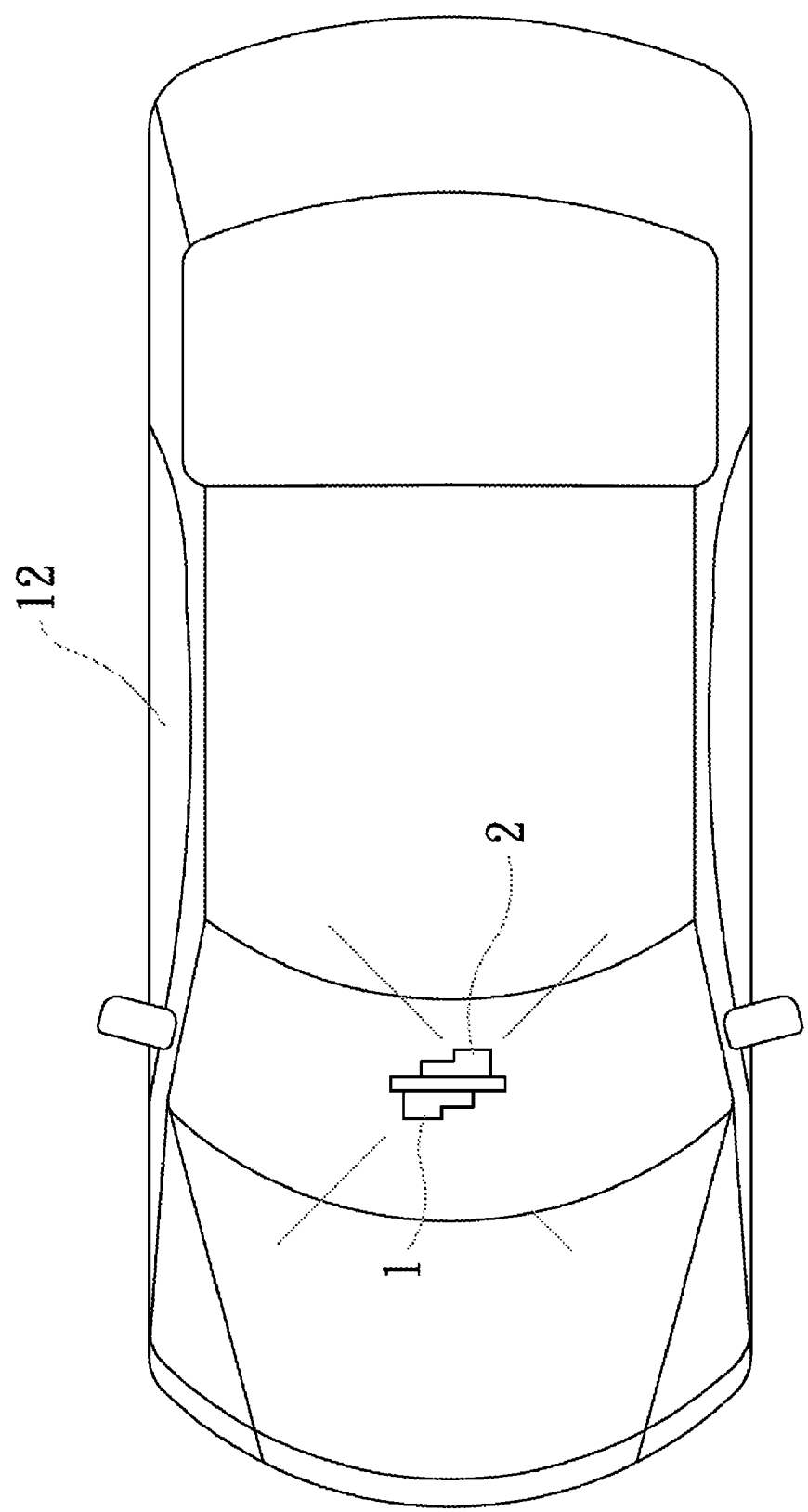
FIG. 2 is a schematic view showing the installation of two image acquiring units of the present invention in a car.

Please refer to FIG. 1, which is a block diagram of an automatic in-car video recording apparatus according to a first embodiment of the present invention. The automatic in-car video recording apparatus is installed in a car 12, as shown in FIG. 2, for recording and saving images of driving conditions inside and outside the car. As can be seen from FIG. 1, the automatic in-car video recording apparatus includes a first image acquiring unit 1, a second image acquiring unit 2, an image processing unit 3, a control unit 4, an image access unit 5, a detecting unit 6, and a power supply unit 7. The control unit 4 is electrically connected to the image processing unit 3, the image access unit 5, the detecting unit 6, and the power supply unit 7. The power supply unit 7 supplies power needed by all other units of the present invention to operate normally. The image access unit 5 includes an externally connected memory unit 51. The first image acquiring unit 1 and the second image acquiring unit 2 are electrically connected to the image processing unit 3. The images acquired by the first and the second image acquiring unit 1, 2 are processed by the image processing unit 3 and then directly saved in the image access unit 5. Part of the data saved in the image access unit 5 will be stores on the memory unit 51 by the control unit 4 at preset time intervals. In the event the detecting unit 6 detects any abnormal condition, the control unit 4 will also be driven to copy the image data saved in the image access unit 5 to the memory unit 51, so that images showing important driving conditions of the car can be automatically recorded and saved. The power supply unit 7 can be an in-car power source originally provided on the car.

Figure 4:
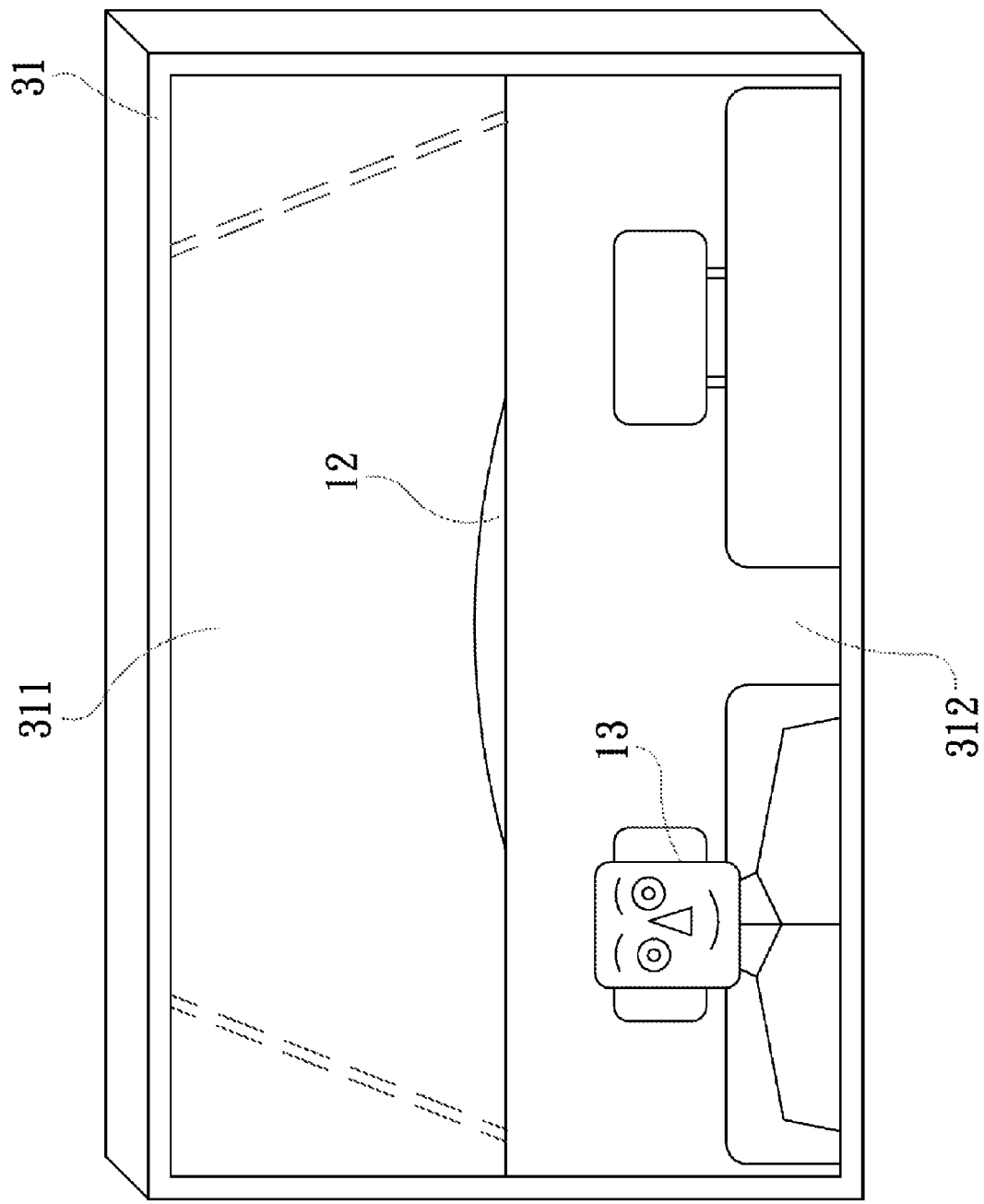
FIG. 4 is a schematic view of a split screen for an image display unit of the present invention.

As can be seen from FIG. 2, the first image acquiring unit 1 is used to shoot images of road conditions in front of the car. On the other hand, the second image acquiring unit 1 is used to synchronously shoot images of conditions inside the car, especially the driving conditions of a driver 13, as shown in FIG. 4. The image processing unit 3 integrates the images synchronously shot by the first and the second image acquiring unit 1, 2, so that an image 311 showing the driving conditions outside the car 12 and an image 312 showing the driving conditions inside the car 12 are simultaneously presented on an image display unit 31, as shown in FIG. 4.

In the above-described arrangements, the first and the second image acquiring unit 1, 2 can be two cameras. The memory unit 51 for storing important image data can be any type of a removable memory card or a portable storage device, such as a universal serial bus (USB) mass storage device. In addition to be linked with various in-car driving recorders, such as a speedometer, a trip computer, etc., according to actual need, the detecting unit 6 can also be further linked with other in-car sensing elements, such as an airbag sensor and an anti-lock braking system (ABS) sensor. These sensors are initially designed to be automatically actuated in case of any abnormal conditions of the car. Since the timing of actuating the existing in-car sensors is the same as that of the present invention, the present invention can directly utilize these existing in-car sensors to thereby reduce the manufacturing cost of the present invention.

Once the car is started, the first and the second image acquiring unit 1, 2 are synchronously turned on to acquire images. The images acquired by the first and the second image acquiring unit 1, 2 are processed by the image processing unit 3 and then temporarily saved in the image access unit 5. Different lengths of the acquired images or individual images acquired at specific time points will be retrieved from the image data temporarily saved in the image access unit 5 and then stored on the memory unit 51 by the control unit 4 at preset time intervals. In addition, the detecting unit 6 constantly detects the driving conditions. Once an unusual condition is detected by the detecting unit 6, such as the ABS is actuated due to an abrupt braking, a vibration of the car body exceeded a preset value due to considerably serious collision, an uncontrollable steering wheel resulted from tire skidding, or emergent braking is sensed by an in-car vibration sensor, airbags in the car are inflated due to car collision, etc., the images acquired immediately before the occurrence of the unusual condition will be directly copied to the memory unit 51 by the control unit 4. And, the images acquired after the unusual condition are continuously copied to the memory unit 51. Therefore, images showing the conditions outside the car and the driver's driving conditions at the time of an accident can be kept and used as a basis for determining who should be responsible for the accident.

With the above arrangements, the images showing the road conditions in front of the car 12 and the images showing the conditions inside the car 12 are respectively recorded by the synchronized first and second image acquiring units 1, 2, which are two cameras in the illustrated embodiments of the present invention. The image processing unit 3 integrates the images showing outside and inside conditions of the car, so that they are simultaneously displayed on one single screen. In case of an accident, the integrated images allow an investigator to clearly observe how the accident occurred. According to the images synchronously acquired by the two cameras, the accident site can be more clearly recreated. With the automatic in-car video recording apparatus of the present invention, the images of the road conditions in front of the car 12 and the images of the conditions inside the car 12 can be synchronously monitored and recorded to help in easily determining the person who should be responsible for the accident and saving the car owners a lot of troubles.

Figure 3:
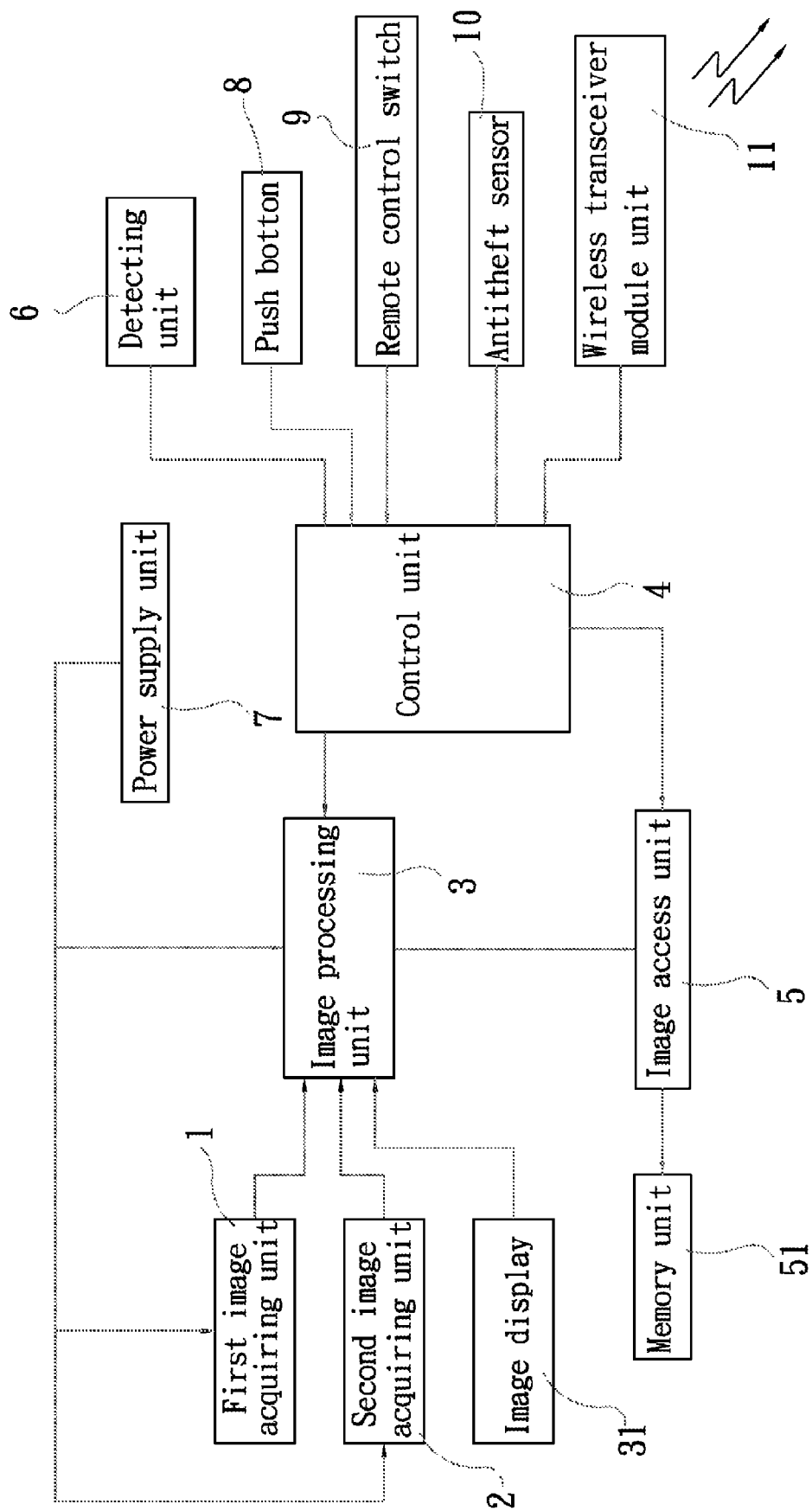
FIG. 3 is a block diagram of an automatic in-car video recording apparatus according to a second embodiment of the present invention.

Please refer to FIG. 3, which is a block diagram of an automatic in-car video recording apparatus according to a second embodiment of the present invention. In the second embodiment, the image processing unit 3 is further connected to an image display unit 31. With the image display unit 31, a user can conveniently check whether the recorded images are complete or not. The image display unit 31 can be a liquid crystal display (LCD) screen as that shown in FIG. 4. The LCD screen can be an independent element arranged in the car. Alternatively, the LCD screen can be combined with an existing LCD screen in the car as would be found in most of the existing cars. In the latter case, a user can directly display the images on the existing in-car LCD screen.

In the first embodiment of the present invention, the control unit 4 controls the copy of the image data in the image access unit 5 to the memory unit 51 according to the detection by the detecting unit 6. In the second embodiment, a push button 8 and/or a remote control switch 9 is provided to allow a user to manually or remotely control the control unit 4 to copy the image data in the image access unit 5 to the memory unit 51. The control unit 4 can also be connected to an antitheft sensor unit 10 further included in the present invention. In the event the antitheft sensor unit 10 detects that an in-car antitheft system is triggered, the control unit 4 is automatically actuated to copy the image data in the image access unit 5 to the memory unit 51.

In the second embodiment of the present invention, a wireless transceiver module unit 11 is further provided. The wireless transceiver module unit 11 is electrically connected to the image access unit 5 and the control unit 4, as shown in FIG. 3. The wireless transceiver module unit 11 can employ any currently available wireless communication techniques, such as infrared, Bluetooth, GPRS, or 3G, to wirelessly link with an external or a remote apparatus for data transmission. In case of an accident, important images can be transmitted to the remote apparatus via the wireless transceiver module unit 11. Therefore, critical image data can be protected against loss due to a damaged car. Moreover, in case of a special event, such as the car 12 is stolen or robbed, the remote apparatus can be directly linked with the control unit 4 via the wireless transceiver module unit 11 to enable automatic transmission of the images in real time, assisting the car owner in locating the car or finding the suspect, etc. With the real-time image transmission, the stolen car 12 can be more quickly recovered and the crime detection rate can be effectively increased.

In conclusion, the automatic in-car video recording apparatus of the present invention is able to automatically record images showing the conditions in front of, behind, and inside a car in traveling. And, in case of an emergency, or when the user deems necessary, the image data temporarily saved in the image access unit can be immediately copied to the memory unit for use later as a powerful evidencing support. With the image data provided by the present invention, the one who is to be responsible for an accident can be easily determined to save car owners repeated and time-consuming investigation and lawsuit. Moreover, under the surveillance of the automatic in-car video recording apparatus, a driver is urged to drive safely. Therefore, the safety in driving can be ensured.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An automatic in-car video recording apparatus for installing in a car to record and save images of driving conditions inside and outside the car when the car is started, the automatic in-car video recording apparatus comprising:
   a first image acquiring unit for acquiring images of road conditions in front of the car;
   a second image acquiring unit synchronized with the first image acquiring unit for acquiring images of conditions inside the car;
   an image display unit;
   an image processing unit integrating the images synchronously acquired by the first and the second image acquiring unit, so that images showing conditions inside and outside the car are simultaneously presented as a single image, wherein the image processing unit is electrically connected to the image display unit;
   an image access unit for saving the synchronized images inside and outside the car that have been processed by the image processing unit, and further including an externally connected memory unit; a control unit for periodically storing part of the image data saved in the image access unit on the memory unit at preset time intervals;
   a detecting unit for detecting abnormal driving conditions, and driving the control unit to copy the image data saved in the image access unit to the memory unit when any abnormal condition is detected by the detecting unit, wherein all images acquired by said first and second image acquiring units are continuously copied to the memory unit by the control unit after an unusual driving condition is detected; and
   a power supply unit for supplying power needed by all other units to operate normally.

2. The automatic in-car video recording apparatus as claimed in claim 1, wherein the memory unit is selected from the group consisting of a removable memory card and a storage device.

3. The automatic in-car video recording apparatus as claimed in claim 1, wherein the detecting unit is electrically connected to an in-car airbag sensor.

4. The automatic in-car video recording apparatus as claimed in claim 1, wherein the detecting unit is electrically connected to an in-car vibration sensor.

5. The automatic in-car video recording apparatus as claimed in claim 1, wherein the detecting unit is electrically connected to an in-car ABS sensor.

6. The automatic in-car video recording apparatus as claimed in claim 1, wherein the image display unit is an in-car LCD screen.

7. The automatic in-car video recording apparatus as claimed in claim 1, further comprising a push button and a remote control switch, allowing a user to selectively manually or remotely control the control unit to copy the image data saved in the image access unit to the memory unit.

8. The automatic in-car video recording apparatus as claimed in claim 1, further comprising an antitheft sensor unit for driving the control unit to copy the image data saved in the image access unit to the memory unit when the antitheft sensor unit detects that an in-car antitheft system is triggered.

9. The automatic in-car video recording apparatus as claimed in claim 1, further comprising a wireless transceiver module unit electrically connected to the image access unit and the control unit.

* * * * *